United States Patent [19]

Faulkner

[11] Patent Number: 4,955,284
[45] Date of Patent: Sep. 11, 1990

[54] PISTON HAVING CERAMIC PARTS

[75] Inventor: Henry B. Faulkner, Dover, Mass.

[73] Assignee: Ingersoll-Rand Company, Woodcliff Lake, N.J.

[21] Appl. No.: 315,977

[22] Filed: Feb. 27, 1989

[51] Int. Cl.[5] .................................................. F16J 9/00
[52] U.S. Cl. .......................................... 92/248; 92/257; 92/258; 92/169.2; 92/170.1
[58] Field of Search ............ 92/212, 213, 216, 217, 92/218, 219, 220, 221, 222, 245, 257, 258, 169.1, 169.2, 170.1; 123/193 P

[56] References Cited

U.S. PATENT DOCUMENTS

| | | | |
|---|---|---|---|
| 1,731,147 | 10/1929 | Moyer et al. | 92/248 |
| 1,751,350 | 3/1930 | Moyer et al. | 92/248 |
| 3,783,612 | 1/1974 | DeLigny et al. | 92/258 |
| 3,880,055 | 4/1975 | Nakamura et al. | 92/170.1 |
| 4,197,787 | 4/1980 | Schneider | 92/170.1 |
| 4,466,399 | 8/1984 | Hinz et al. | 123/193 P |
| 4,548,125 | 10/1985 | Huther | 92/212 |
| 4,630,958 | 12/1986 | McCallister | 92/257 |
| 4,751,871 | 6/1988 | Burghardt et al. | 92/257 |
| 4,777,844 | 10/1988 | DeBell et al. | 92/222 |
| 4,846,051 | 7/1989 | Wade et al. | 92/170.1 |

FOREIGN PATENT DOCUMENTS

| | | | |
|---|---|---|---|
| 1433240 | 1/1969 | Fed. Rep. of Germany | 92/258 |
| 91658 | 3/1958 | Norway | 92/258 |
| 95391 | 4/1939 | Sweden | 92/258 |
| 1229445 | 4/1971 | United Kingdom | 92/258 |

*Primary Examiner*—Edward K. Look
*Assistant Examiner*—Thomas Denion
*Attorney, Agent, or Firm*—James R. Bell

[57] ABSTRACT

A piston has a first endwall, a second endwall and a tubular ceramic sidewall extending between and forming a closed cylinder with the endwalls. The piston does not include a piston ring. The first endwall is substantially flexible and is releasably interconnected with the second endwall by means of connection with an extended portion of an associated piston rod mounted in a hub of the second endwall. As a result, the first endwall is urged into a concave configuration. The ceramic piston sidewall is mounted for reciprocation within a ceramic cylindrical wall. An anti-rotation device is provided to limit rotation of the endwalls relative to the sidewall, and another anti-rotation device is provided to limit rotation of the hub relative to the piston rod.

12 Claims, 3 Drawing Sheets

PISTON HAVING CERAMIC PARTS

BACKGROUND OF THE INVENTION

This invention relates generally to expansible chamber devices which include a reciprocating piston, and more particularly to a piston having a non-metallic portion or portions.

Ceramic materials are available which are significantly harder, have a lower coefficient of friction, and have a lower coefficient of thermal expansion than the metallic materials conventionally used in reciprocating machinery. In some types of reciprocating machines, these materials can be used to advantage in the design of the piston/cylinder interface. Ceramic materials are particularly advantageous in cases where some component of the working fluid or fuel, which is present in the cylinder during operation, is incompatible with oil lubrication of the piston and piston rings.

The side walls of both the piston and cylinder can be made of ceramic material, so that there is only a ceramic-on-ceramic sliding interface. This arrangement takes advantage of the hardness and low coefficient of friction of the ceramic materials. It also provides a sliding interface which may have adequate life without lubrication, particularly if a crosshead is used to eliminate side loads from the crank mechanism.

A clearance is specified between the piston and cylinder to prevent seizing under the worst case of temperature difference between the piston and cylinder. If the piston and cylinder are made of ceramic material, the low coefficient of thermal expansion permits this clearance to be reduced. Then it is possible in some cases to eliminate the piston rings, and use the small clearance between the piston and cylinder to control blowby. This means that oil lubrication is not required for the piston or piston rings, and hence the lubricating oil can be eliminated from the cylinder spaced entirely, and isolated from the working fluid or fuel. In addition, the piston rings are the largest source of friction in most reciprocating machines. Hence elimination of the rings can improve brake efficiency directly.

A key problem with the use of ceramic materials in reciprocating machines is the design of an interface between the ceramic and metal parts which minimizes stresses under differential thermal expansion. Tensile stress in the ceramic material is particularly dangerous. Also fabrication of ceramic parts is expensive, particularly if much machining is involved. Therefore, it is desirable to keep the ceramic portion of the assembly small, and to keep the shape of the ceramic components as simple as possible. Only the sliding surface of the piston and cylinder can benefit from the properties of the ceramic materials.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a piston having ceramic parts. The piston has a first endwall, a second endwall and a tubular sidewall extending between and forming a closed cylinder with the first and second endwalls. The sidewall is of ceramic material. The piston is free of a piston ring. At least the first endwall is of metal. An anti-rotation means limits rotation of the endwalls relative to the sidewall.

The foregoing and other aspects will become apparent from the following detailed description of the invention when considered in conjunction with the accompanying drawing figures. It is to be expressly understood, however, that the drawing figures are not intended as a definition of the invention but are for the purpose of illustration only.

BRIEF DESCRIPTION OF THE DRAWING FIGURES

DETAILED DESCRIPTION

Figure 1:
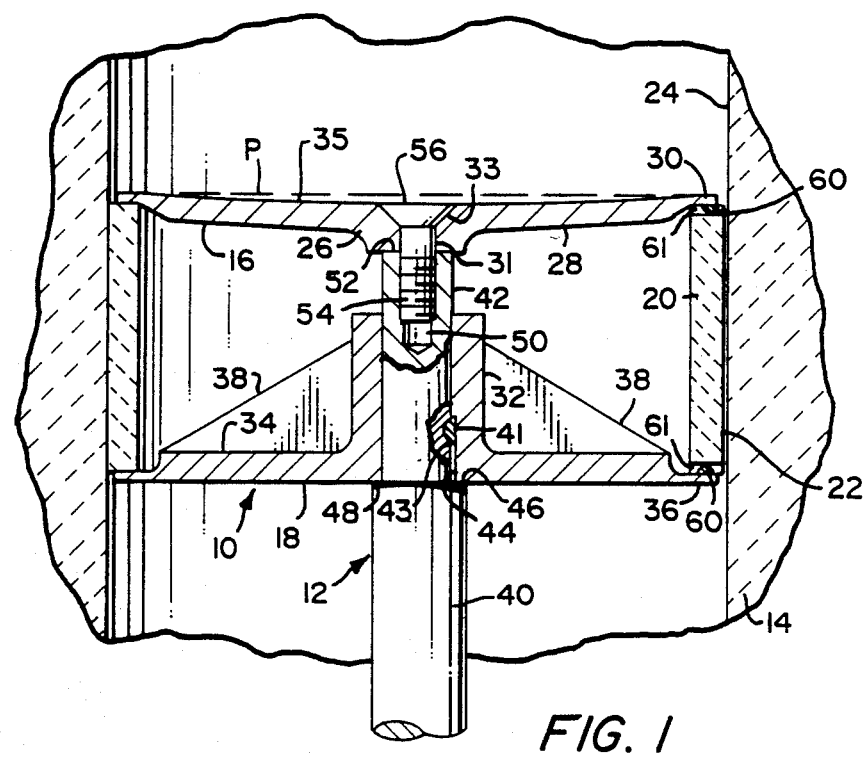
FIG. 1 is a cross-sectional side view illustrating an embodiment of the piston of the present invention.

Referring now to the drawings, FIG. 1 illustrates a piston 10 mounted on a piston rod 12 for reciprocation in a ceramic walled cylinder 14.

Piston 10 includes a first endwall 16, a second endwall 18 and a tubular sidewall 20 thus forming a closed cylindrical body. Sidewall 20 is preferably a tubular member of ceramic material. An outer surface 22 of sidewall 20 is mounted concentrically within and in such proximity with a mating ceramic surface 24 of cylinder 14 so a not to require a piston ring.

First endwall 16 is of a well known piston type metal such as aluminum, and is a disc-shaped member having a central portion 26, an intermediate portion 28 and a circumferential portion 30. Central portion 26 includes an axial bore 31 formed therethrough preferably having a countersink 33 formed in surface 35 of first endwall 16.

Second endwall 18 is preferably of metal such as aluminum, and is a disc-shaped member including a central hub 32, an intermediate portion 34 and a circumferential portion 36. A plurality of radially extending reinforcing ribs 38 interconnect intermediate portion 34 and hub 32 thus substantially reinforcing second endwall 18. Therefore, it can be seen that first endwall 16 is more flexible than second endwall 18 due to the ribs 38 which stiffen endwall 18. As a result, flexible endwall 16 absorbs the differential thermal expansion between the ceramic and metal components of piston 10.

Piston rod 12 includes a main portion 40, and an extended portion 42 which is of a reduced diameter relative to main portion 40 and fits into a bore 44 formed in hub 32. Extended portion 42 abuts central portion 26 of endwall 16. An annular shoulder 46, between main portion 40 and extended portion 42 abuts a surface 48 of second endwall 18. Extended portion 42 also includes a threaded axial blind bore 50 therein. A key 41 formed on hub 32 protrudes into an accommodating keyway 43 formed in piston rod 12 to limit rotation of hub 32 relative to rod 12.

A suitable threaded fastener 54 provides a means for releasably interconnecting first endwall 16 and second endwall 18. Threaded member 54 is threadedly received in bore 50, and upon threading fastener 54 into bore 50 so that a surface 56 of fastener 54 is flush with surface 35 of first endwall 16 and a terminal end 52 of extended portion 42 is in abutment with central portion 26, surface 35 of flexible first endwall 16 is dished or assumes a concave configuration as can be seen relative to a plane indicated by the dotted line designated P. As a result, tubular sidewall 20 is clamped between circumferential portion 30 of first endwall 16 and circumferential portion 36 of second endwall 18.

As an alternative, second endwall 18a and sidewall 20a may be integratedly formed into a one-piece structure of ceramic material and include reinforcing ribs 38a. As such, the resulting piston structure 10a maintains the identical first endwall 16 as described above, including the concave configuration upon attachment to the piston rod 12.

Figure 2:
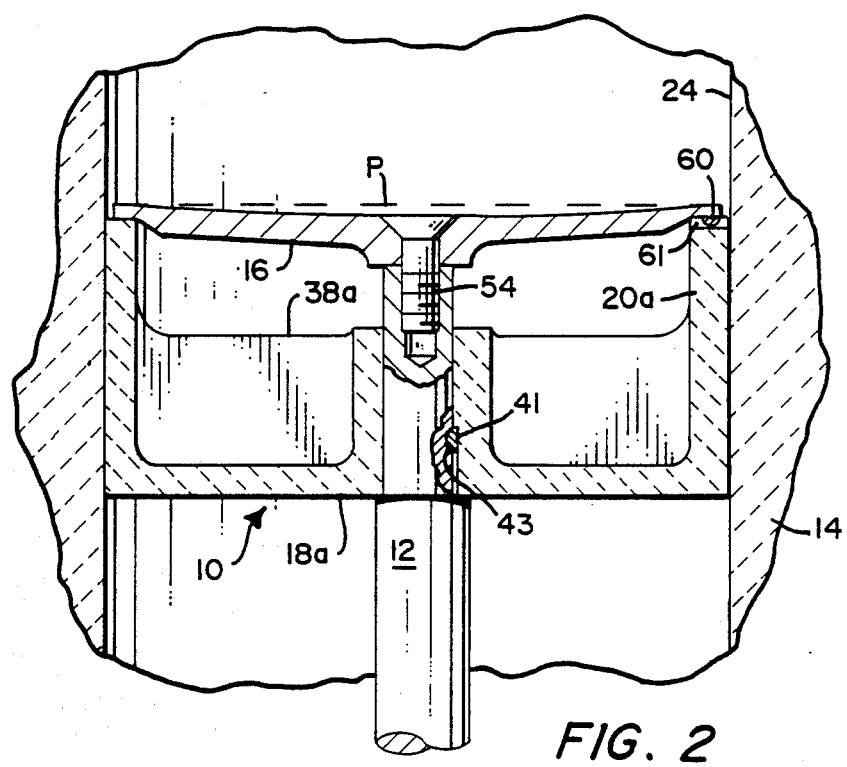
FIG. 2 is a cross-sectional side view illustrating an alternative embodiment of the piston of the present invention.
Figure 3:
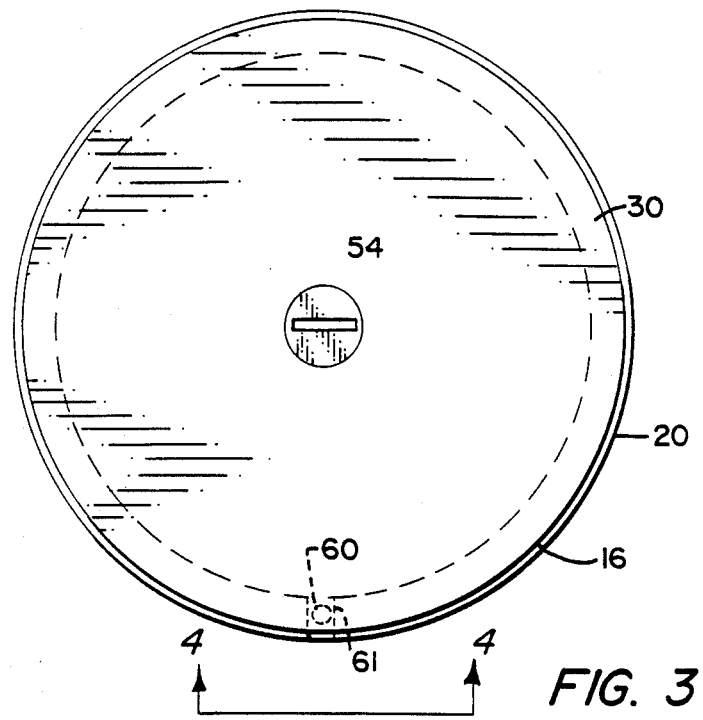
FIG. 3 is a top view illustrating an embodiment of an anti-rotation device which may be used with the pistons of the present invention.
Figure 4:
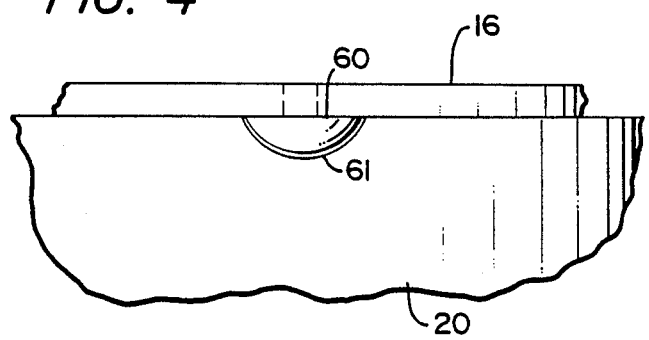
FIG. 4 is an enlarged side view of the anti-rotation device taken along the line 4—4 of FIG. 3.

In the embodiment of FIG. 1, it is preferable to limit relative motion and wear between rod 12, second endwall 18, sidewall 20, and first endwall 16. In the alternative embodiment of FIG. 2, it is preferable to limit relative motion between piston rod 12, one-piece end and sidewall 18a, 20a, and first endwall 16. Such relative motion could cause fastener 54 to become loose. Therefore it is necessary to limit rotation of these parts with respect to piston rod 12, and with respect to each other. The second endwall 18, FIG. 1, or one-piece end and sidewall 18a, 20a, FIG. 2, is limited from rotating with respect to piston rod 12 as discussed above. Relative motion between first endwall 16 and sidewall 20, FIG. 1, is limited by a key 60, formed on the circumferential portion 30 of first endwall 16, which engages a keyway 61 formed in an edge of sidewall 20. Key 60 could, for example, be formed by the head of rivet installed in the circumferential portion 30 of endwall 16. In the embodiment of FIG. 1, relative motion between sidewall 20 and second endwall 18 is also limited in the same way by another key 60 formed on circumferential portion 36 of second endwall 18 which engages another keyway 61 in an opposite edge of sidewall 20. In the embodiment of the FIG. 2, anti-rotation between endwall 16 and one-piece end and sidewall 18a, 20a, is similar to that described for the embodiment of FIG. 1. However, in view of the one-piece construction of end and sidewall 18a, 20a, no additional anti-rotation device is neccessary.

While this invention has been illustrated and described in accordance with a preferred embodiment, it is recognized that other variations and changes may be made therein without departing from the invention as set forth in the claims.

What is claimed is:

1. A piston having ceramic parts, comprising:
    a first endwall, said first endwall being free of ribs and of a first stiffness;
    a second endwall, said second endwall having a hub and being reinforced by ribs extending radially outwardly from the hub, said second endwall being of a second stiffness greater than the first stiffness;
    means for limiting rotation of the hub relative to an associated piston rod;
    a tubular sidewall extending between and forming a closed cylinder with the first and second endwalls, the sidewall being of ceramic material, the piston being free of a piston ring and at least the first endwall is of metal; and
    means for limiting rotation of the endwalls relative to the sidewall.

2. The piston of claim 1, including:
    means for releasably interconnecting the first and second endwalls in a manner sufficient to urge the first endwall into a concave configuration.

3. The piston of claim 2, wherein the second endwall is of ceramic material and is integratedly formed with the sidewall.

4. The piston of claim 2, wherein the second endwall is of metal.

5. The piston of claim 4, wherein the tubular sidewall is clamped between the first and second endwalls.

6. A piston and piston rod combination, the piston having ceramic parts, comprising:
    a first endwall, said first endwall being free of ribs and of a first stiffness;
    a second endwall interconnected with the first endwall via the piston rod, said second endwall having a hub and ribs extending radially outwardly from the hub and being of a second stiffness greater than the first stiffness;
    means for limiting rotation of the hub relative to the piston rod;
    a tubular sidewall extending between and forming a closed cylinder with the first and second endwalls, the sidewall being of ceramic material, the piston being free of a piston ring and at least the first endwall is of metal; and
    means for limiting rotation of the endwalls relative to the sidewall.

7. The combination of claim 6, wherein the piston rod has an extended portion extending into the hub.

8. The combination of claim 7, including:
    means for releasably interconnecting the first and second endwalls via the extended portion in a manner sufficient to urge the first endwall into a concave configuration.

9. A piston and piston rod combination mounted for reciprocating in a cylinder, the piston having ceramic parts, comprising:
    a first endwall, said first endwall being free of ribs and of a first stiffness;
    a second endwall interconnected with the first endwall via the piston rod, said second endwall having a hub and ribs extending radially outwardly from the hub and being of a second stiffness greater than the first stiffness;
    means for limiting rotation of the hub relative to the piston rod;
    a tubular sidewall extending between and forming a closed cylinder with the first and second endwalls, the sidewall being of ceramic material, the piston being free of a piston ring and at least the first endwall is of metal; and
    means for limiting rotation of the endwalls relative to the sidewall.

10. The combination of claim 9, wherein the piston rod has an extended portion extending into the hub.

11. The combination of claim 10, wherein the tubular sidewall is clamped between the first and second endwalls.

12. The combination of claim 11, including:
    means for releasably interconnecting the first and second endwalls via the extended portion in a manner sufficient to urge the first endwall into a concave configuration, whereby the sidewall is positioned concentrically within and in substantial proximity with said cylinder.

* * * * *